US008888385B2

(12) United States Patent
Cirker

(10) Patent No.: US 8,888,385 B2
(45) Date of Patent: *Nov. 18, 2014

(54) PRIVACY ENSURING COVERT CAMERA

(76) Inventor: Seth Cirker, Port Washington, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/352,153

(22) Filed: Jan. 17, 2012

(65) Prior Publication Data

US 2012/0113263 A1 May 10, 2012

Related U.S. Application Data

(63) Continuation of application No. 12/550,152, filed on Aug. 28, 2009, now Pat. No. 8,123,419, which is a continuation-in-part of application No. 11/859,485, filed on Sep. 21, 2007, now Pat. No. 7,874,744.

(51) Int. Cl.
| | | |
|---|---|---|
| *G03B 17/00* | (2006.01) | |
| *H04N 5/225* | (2006.01) | |
| *G08B 13/196* | (2006.01) | |
| *G03B 11/00* | (2006.01) | |
| *G03B 17/02* | (2006.01) | |

(52) U.S. Cl.
CPC .............. *G03B 17/02* (2013.01); *H04N 5/2252* (2013.01); *G08B 13/19632* (2013.01); *G08B 13/19634* (2013.01); *G08B 13/1963* (2013.01); *H04N 5/2254* (2013.01); *G03B 11/00* (2013.01); *G08B 13/19619* (2013.01)
USPC ........................................................ 396/427

(58) Field of Classification Search
CPC ........................................................ H04N 5/225
USPC ................................................. 396/427, 433
See application file for complete search history.

(56) References Cited

U.S. PATENT DOCUMENTS

| | | | |
|---|---|---|---|
| 4,019,192 A | | 4/1977 | Miyagawa |
| 4,080,629 A | | 3/1978 | Hammond |
| 4,283,132 A | * | 8/1981 | Engelsmann et al. ........ 396/448 |
| 4,857,912 A | | 8/1989 | Everett et al. |
| 4,978,984 A | | 12/1990 | Brookfield |
| 5,455,561 A | | 10/1995 | Brown |
| 5,610,656 A | | 3/1997 | Bernhardt |
| 5,666,157 A | | 9/1997 | Aviv |
| 5,740,480 A | | 4/1998 | Kuhn, Jr. et al. |

(Continued)

FOREIGN PATENT DOCUMENTS

| | | |
|---|---|---|
| DE | 20219004 U1 | 3/2003 |
| EP | 1244322 A1 | 6/2005 |

(Continued)

OTHER PUBLICATIONS

Polycom, ViaVideo User's Guide, Nov. 2000.

(Continued)

*Primary Examiner* — Rodney Fuller
(74) *Attorney, Agent, or Firm* — Holland & Hart, LLP

(57) ABSTRACT

A device for monitoring a privacy sensitive area, includes an image receiving device, such as a camera, disposed inside a housing chassis. The image receiving device includes a camera lens. Additionally, a movable obstruction member configured to selectively obstruct a camera lens is disposed on the device and is configured to change a position to selectively obstruct or expose the camera lens. The position of the movable obstruction member is dependent upon a threat level received by the device.

18 Claims, 7 Drawing Sheets

(56) References Cited

U.S. PATENT DOCUMENTS

| | | |
|---|---|---|
| 6,064,430 A | 5/2000 | Lefkowitz |
| 6,354,749 B1 | 3/2002 | Pfaffenberger, II |
| D470,522 S | 2/2003 | Friedricks et al. |
| 6,524,020 B2 | 2/2003 | Ellinger et al. |
| 6,652,164 B2 | 11/2003 | Stiepel |
| 6,696,957 B2 * | 2/2004 | Shepher .................. 340/573.1 |
| 6,816,073 B2 | 11/2004 | Vaccaro et al. |
| 6,850,025 B1 | 2/2005 | Paolantonio et al. |
| 6,917,293 B2 | 7/2005 | Beggs |
| 6,940,397 B1 | 9/2005 | Le Mire |
| 7,066,662 B2 | 6/2006 | Cuddeback |
| 7,088,387 B1 | 8/2006 | Freeman et al. |
| 7,095,328 B1 | 8/2006 | Stern et al. |
| 7,119,832 B2 | 10/2006 | Blanco et al. |
| 7,131,136 B2 | 10/2006 | Monroe |
| 7,187,279 B2 | 3/2007 | Chung |
| 7,217,045 B2 | 5/2007 | Jones |
| 7,280,030 B1 | 10/2007 | Monaco |
| 7,463,145 B2 | 12/2008 | Jentoft |
| 7,471,334 B1 * | 12/2008 | Stenger ...................... 348/373 |
| 7,477,285 B1 | 1/2009 | Johnson |
| 8,000,588 B1 | 8/2011 | Harvey |
| 8,123,419 B2 * | 2/2012 | Cirker ......................... 396/427 |
| 2001/0037509 A1 | 11/2001 | Kligman |
| 2002/0081110 A1 | 6/2002 | Johnson et al. |
| 2003/0053536 A1 | 3/2003 | Ebrami |
| 2003/0102967 A1 | 6/2003 | Kao |
| 2003/0185556 A1 | 10/2003 | Stiepel et al. |
| 2003/0210139 A1 | 11/2003 | Brooks |
| 2004/0003051 A1 | 1/2004 | Krzyzanowski et al. |
| 2004/0008253 A1 | 1/2004 | Monroe |
| 2004/0013192 A1 | 1/2004 | Kennedy |
| 2004/0032493 A1 | 2/2004 | Franke et al. |
| 2004/0075547 A1 | 4/2004 | Vojtech et al. |
| 2004/0119591 A1 | 6/2004 | Peeters |
| 2004/0190767 A1 | 9/2004 | Tedesco et al. |
| 2004/0253926 A1 | 12/2004 | Gross |
| 2005/0104773 A1 | 5/2005 | Clarke et al. |
| 2005/0119584 A1 | 6/2005 | Carter |
| 2005/0123172 A1 | 6/2005 | Henson |
| 2005/0146609 A1 | 7/2005 | Creamer et al. |
| 2005/0146610 A1 | 7/2005 | Creamer et al. |
| 2005/0149979 A1 | 7/2005 | Creamer et al. |
| 2005/0181762 A1 | 8/2005 | Kauppila |
| 2005/0186954 A1 | 8/2005 | Kenney |
| 2005/0225635 A1 | 10/2005 | Meitzler et al. |
| 2005/0248444 A1 | 11/2005 | Joao |
| 2005/0288075 A1 | 12/2005 | Geernaert |
| 2006/0000971 A1 | 1/2006 | Jones |
| 2006/0022829 A1 | 2/2006 | Pan |
| 2006/0050150 A1 * | 3/2006 | Yamane ....................... 348/151 |
| 2006/0063523 A1 | 3/2006 | McFarland |
| 2006/0064384 A1 | 3/2006 | Mehrotra et al. |
| 2006/0080541 A1 | 4/2006 | Monaco et al. |
| 2006/0081343 A1 | 4/2006 | Clark et al. |
| 2006/0098729 A1 | 5/2006 | Shen |
| 2006/0104444 A1 | 5/2006 | Hampapur et al. |
| 2006/0109113 A1 | 5/2006 | Reyes et al. |
| 2006/0253885 A1 | 11/2006 | Murphy |
| 2007/0011722 A1 | 1/2007 | Hoffman |
| 2007/0013513 A1 | 1/2007 | Tang et al. |
| 2007/0040672 A1 | 2/2007 | Chinigo |
| 2007/0205876 A1 | 9/2007 | Nguyen |
| 2007/0207750 A1 | 9/2007 | Brown et al. |
| 2007/0269202 A1 | 11/2007 | Forsyth-Martinez |
| 2008/0198159 A1 | 8/2008 | Liu et al. |
| 2008/0198231 A1 | 8/2008 | Ozdemir |
| 2008/0224862 A1 | 9/2008 | Cirker |
| 2008/0259161 A1 | 10/2008 | Hellman |
| 2008/0288986 A1 | 11/2008 | Foster et al. |
| 2009/0021593 A1 | 1/2009 | Nozaki |
| 2009/0028542 A1 | 1/2009 | Nakamoto et al. |
| 2009/0098820 A1 | 4/2009 | Yabu |
| 2009/0138138 A1 | 5/2009 | Ferren et al. |
| 2009/0185036 A1 | 7/2009 | Bowron |

FOREIGN PATENT DOCUMENTS

| | | |
|---|---|---|
| GB | 2384933 | 8/2003 |
| GB | 2393343 | 3/2004 |
| JP | 56099835 A | 8/1981 |
| JP | 2002158904 | 5/2002 |
| KR | 1020030052511 A | 6/2003 |
| WO | 9501041 | 1/1995 |
| WO | 0117247 | 3/2001 |
| WO | 0156294 | 8/2001 |
| WO | 03041026 | 5/2003 |
| WO | 2004030512 | 4/2004 |
| WO | 2004077308 A1 | 9/2004 |
| WO | 2004095386 A1 | 11/2004 |

OTHER PUBLICATIONS iSight User's Guide, Apple Computer, Inc., 2004.
Supplementary European Search Report for European Patent App. No. EP08782751.5, dated Aug. 22, 2011.
Supplemental European Search Report, EP08831720, dated Nov. 22, 2010 (7 pgs.).
European Search Report for European Patent Application No. EP12155150, dated Apr. 25, 2012.

* cited by examiner

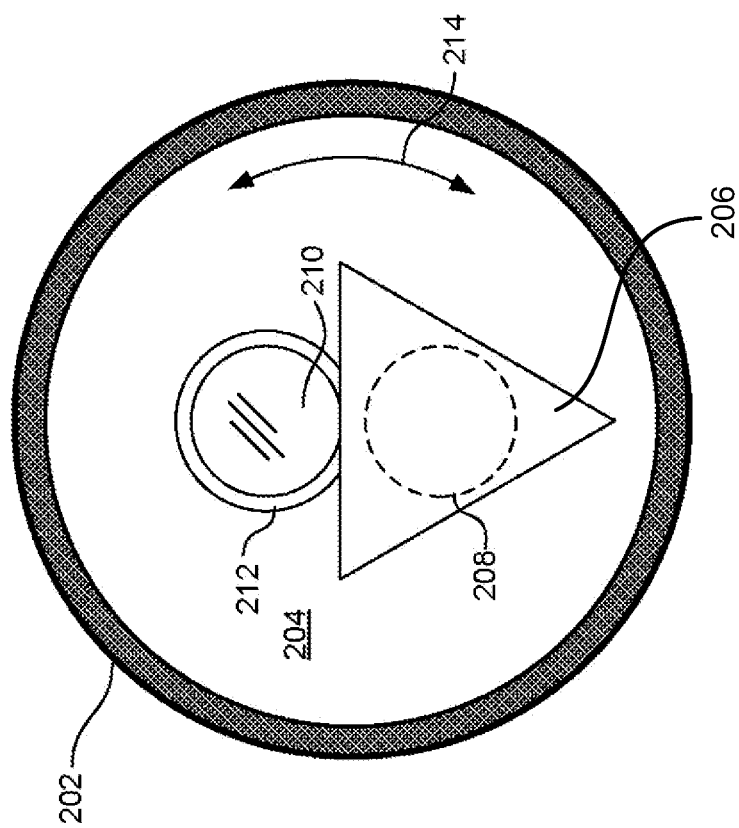
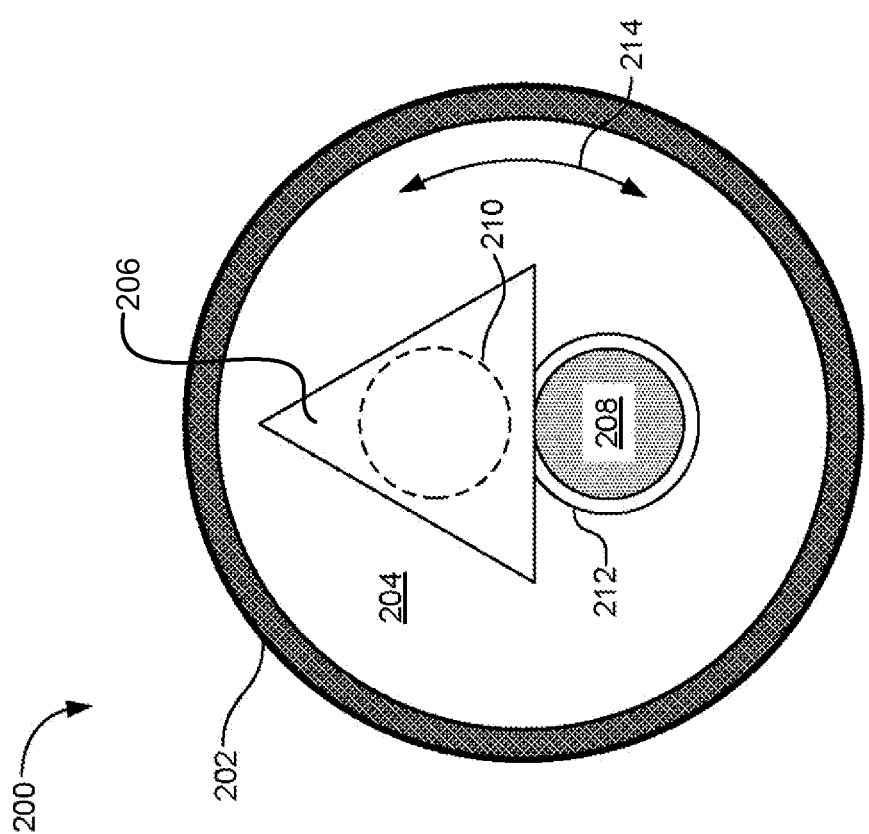
Fig. 2A
Fig. 2B

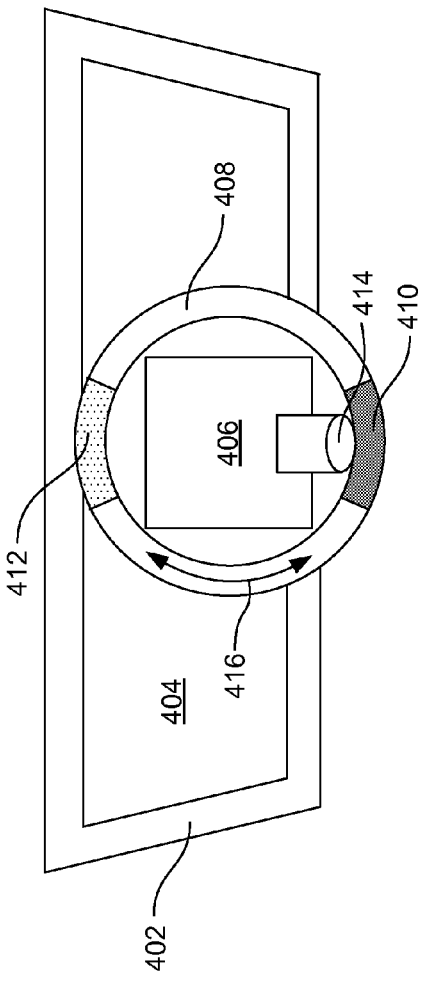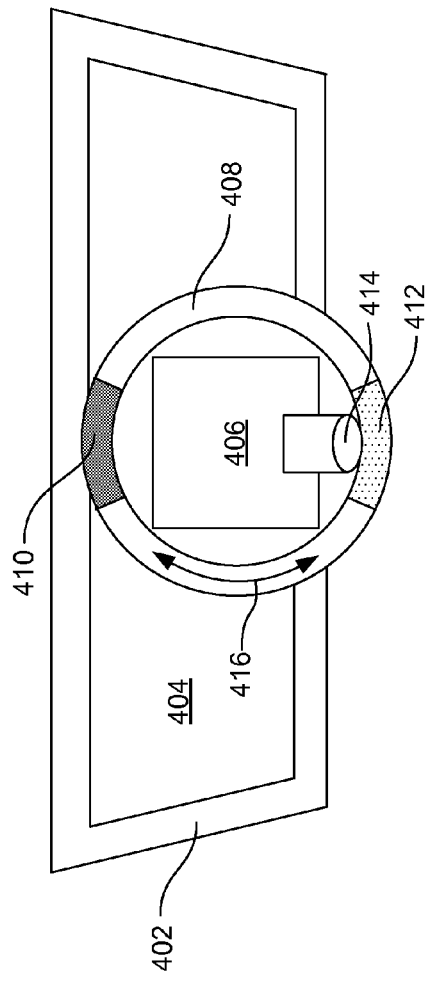

PRIVACY ENSURING COVERT CAMERA

RELATED APPLICATIONS

The present application is a continuation application of U.S. patent application Ser. No. 12/550,152, filed 28 Aug. 2009, titled "Privacy Ensuring Covert Camera," now U.S. Pat. No. 8,123,419, which application is a continuation-in-part of application Ser. No. 11/859,485, filed Sep. 21, 2007 and titled "Privacy Ensuring Camera Enclosure," now issued as U.S. Pat. No. 7,874,744, which applications are incorporated herein by reference in their entireties.

TECHNICAL FIELD

The present exemplary system and method relate to surveillance, monitoring, and security devices. More particularly, the present exemplary system and method relate to masked cameras able to unmask themselves, particularly in the event of high-risk situations.

BACKGROUND

General facility surveillance and other monitoring devices are often desirable to prevent criminal and otherwise undesirable activity as well as provide safety and security for those within the facility. Privacy sensitive areas often preclude complete monitoring of a facility. Areas such as restrooms, offices, changing rooms, and even classrooms have certain privacy expectations associated with them that make the use of continual monitoring of activities inappropriate. However, when high-risk situations such as shootings, hostage situations, or natural disasters occur, an individual's right to privacy may be superseded by a need for surveillance. Additionally, there may be situations where selective activation of surveillance equipment or other systems may be appropriate for safety or convenience reasons, such as when a teacher or employee is alone after hours. However, the use of ever-improving security and surveillance devices is tempered by the desire to protect individuals' rights of privacy.

Surveillance or monitoring apparatuses often include video cameras allowing surveillance images to be viewed and/or recorded at a remote location. For example, an industrial plant, a public school, or a medical facility may have several video cameras at various locations throughout the building and grounds, each camera being communicatively coupled to one or more video screens and/or recorders at central security stations.

Video cameras are also coupled to computers hosting any number of software programs capable of converting video images received from the video cameras into a digital format. Such digital video recordings are particularly useful because they can be digitally transmitted over an Internet or intranet and stored as necessary. When high-risk situations occur, traditional monitoring systems do not provide a convenient way for the owner or authorities to monitor previously restricted locations.

In sum, corporations, public facilities, schools, and nearly every commercial building utilizes a security system in one form or another. Physical security utilizes motion detectors, cameras, and automatic door locks. However, traditional security systems fail to provide adequate security to privacy sensitive locations in the event of a high risk situation.

BRIEF DESCRIPTION OF THE DRAWINGS

The accompanying drawings illustrate various embodiments of the principles described herein and are a part of the specification. The illustrated embodiments are merely examples and do not limit the scope of the claims.

FIGS. 2A and 2B are front views of an exemplary camera lens section of an exemplary masked camera motion detector, according to one embodiment of principles described herein.

FIGS. 4A and 4B are top cross-sectional views of an exemplary camera lens section of an exemplary masked camera motion detector, according to one embodiment of principles described herein.

Throughout the drawings, identical reference numbers designate similar, but not necessarily identical, elements. The elements are not necessarily drawn to scale.

SUMMARY

Figure 1B:
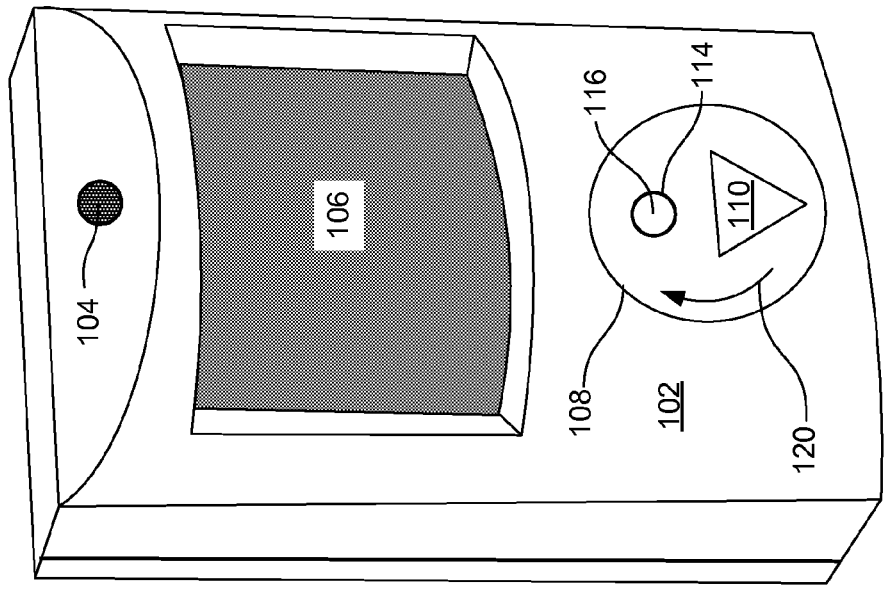
FIGS. 1A and 1B are isometric views of an exemplary masked camera motion detector capable of obstructing or exposing a camera lens, according to one embodiment of principles described herein.

According to one exemplary embodiment, a centralized surveillance and monitoring system is communicatively connected to various monitoring devices such as video cameras. The centralized surveillance and monitoring system is configured to receive, either automatically or manually, a threat-level status. According to one exemplary embodiment, depending on the current threat level, the centralized surveillance system will activate specific cameras or other monitoring devices that are usually inactive to protect privacy concerns. Specific application for areas not typically under continual camera surveillance such as restrooms, classrooms, offices, and locker rooms is provided for. The camera lenses in privacy sensitive areas may be masked and integrated with other common electronic security devices such as a motion detector or a smoke detector. When a masked camera is in an inactive mode, the camera lens is physically obstructed by means of a movable component. In the event of a high risk situation, the camera may go into a surveillance mode in which the obstructing movable component is able to change position, thus exposing the camera lens. This will also indicate to a person familiar with the system, that the system has indeed been activated.

One exemplary embodiment of a security system for a facility includes an interface configured to respond to a received threat level, and a computing module configured to determine whether the received threat level exceeds a threshold value assigned to each portion of the security system. That is, at certain threat levels, various devices with masked cameras may change modes so that the camera lens is exposed, thus providing authorities with security monitoring capability if necessary.

DETAILED DESCRIPTION

As mentioned above, a camera system may be masked and integrated into a device such as a motion detector or smoke or foreign substance detector. For privacy reasons, many areas such as restrooms, changing rooms and other areas do not contain camera monitoring system devices. However, they often contain other security devices such as smoke or foreign substance detectors and motion detectors. The present specification relates to a camera system which is integrated with an alternate device. Alternate devices may include but are not limited to, motion detectors, smoke detectors, clocks, electronic devices, appliances, books, and toys. The masked camera may be placed in a privacy sensitive area or an area not continually monitored by cameras. In one embodiment, the integrated camera lens is physically masked by a movable member. The movable member may change position thus exposing the camera lens during a high risk situation when safety and security supersedes privacy.

In the following description, for purposes of explanation, numerous specific details are set forth in order to provide a thorough understanding of the present systems and methods. It will be apparent, however, to one skilled in the art that the present apparatus, systems and methods may be practiced without these specific details. Reference in the specification to "an embodiment," "an example" or similar language means that a particular feature, structure, or characteristic described in connection with the embodiment or example is included in at least that one embodiment, but not necessarily in other embodiments. The various instances of the phrase "in one embodiment" or similar phrases in various places in the specification are not necessarily all referring to the same embodiment.

Herein and in the appended claims, a security camera or other image receiving device embodying principles described in the present specification will be referred to as a "masked camera." Any reference to a "camera system," will refer to the system of components both internal and external to a security device. The term "security system" will refer to the overall physical security system present in a facility including cameras, motion detectors, monitors and other standard security equipment.

Figure 1A:
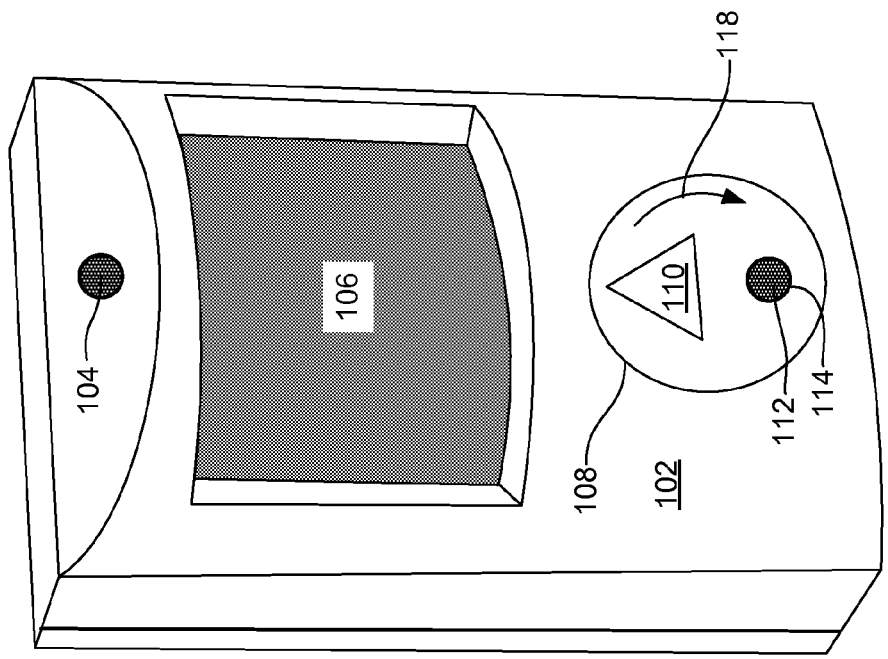

FIGS. 1A and 1B are isometric views of an exemplary masked camera motion detector (100) capable of obstructing or exposing a camera lens. According to the illustrative embodiment shown here, a camera system is integrated with a motion detector (100). The camera system components may be located below the actual motion detector components (106). In one embodiment, screw holes (104,112) may be placed at the top and bottom of the device's chassis (102). The screw holes can be used to disguise the camera lens. FIG. 1A shows the masked camera motion detector (100) while it is in an inactive mode. When the camera system is in an inactive mode, the camera lens could be obstructed by a shape (110). The shape (110) may be placed on a rotating circular plate (108). The circular plate could have a transparent section such as a transparent material, an electrochromatic glass that is selectively transparent via the application of an electrical current, and/or a hole (114) below the shape (110). While the camera system is in an inactive mode, the hole (114) or other transparent member would be exposing the lower screw hole (112). When the camera system enters a surveillance mode, the circular plate may rotate (118) until the hole (114) or other transparent member exposes the camera lens (116) and the shape (110) is obstructing the lower screw hole (112). According to one exemplary embodiment, the electrochromatic glass may remain adjacent to the camera lens (116) and merely receive an electrical current when surveillance is desired.

FIG. 1B shows the masked camera motion detector while in a surveillance mode. In this mode the circular plate (108) has been rotated so that a camera lens (116) is exposed. The shape (110) is now obstructing the screw hole (112) that was exposed when the camera system was in an inactive mode. When the camera system reenters an inactive mode, the circular plate (108) will again rotate (120) thus positioning the shape (110) to obstruct the camera lens (116) and the hole (114) will expose the lower screw hole (112).

The mode of the camera may change from inactive to active for a variety of reasons. If the masked camera system is being utilized by a facility and the facility security determines there is a high enough threat level, they may activate the system. If the masked camera is employed by a home security system, the owner can activate it remotely anytime that is desired.

FIGS. 2A and 2B are front views of an exemplary camera lens section (200) of an exemplary masked camera motion detector (100, FIG. 1). As mentioned above, one embodiment involves a circular plate (204) which is able to rotate and expose or obstruct a camera lens (210). FIG. 2A shows the circular plate system while the masked camera motion detector (100, FIG. 1) is in an inactive mode. In this mode, a shape (206) obstructs the camera lens, while a hole (212) below the shape (206) exposes a screw hole (208). The exact shape (206) which is used to obstruct the camera lens (210) is not limited to the triangle shape shown in the figure. In one embodiment, the shape could be a logo or other design mark. The circular plate (204) is able to rotate (214) and change positions dependent upon which mode the camera system is in.

FIG. 2B shows the circular plate (204) while the camera system is in surveillance mode. In this mode the shape (206) is obstructing the screw hole (208) and exposing the camera lens (210) through the hole (212). The hole (212) is not limited to the circular shape shown. The hole could be of any shape which will allow the camera lens to obtain a sufficient view for security monitoring. The exact method of rotation (214) may be actuated by any exemplary translation or rotation member including, but not limited to, an electrical motor, a magnetic linear motor, a bi-stable mechanism and an actuator, or any other method for rotating the circular plate (204). The circular plate (204) itself may be attached to the front of the masked camera motion detector device through any means that will allow it to rotate (214). In one embodiment, the circular plate could have a track around its circumference in which wheels along the edge cause the rotation. In one embodiment the center of the circular plate (204) could be attached to a rotating axle which is perpendicular to the plate (204).

Figure 3B:
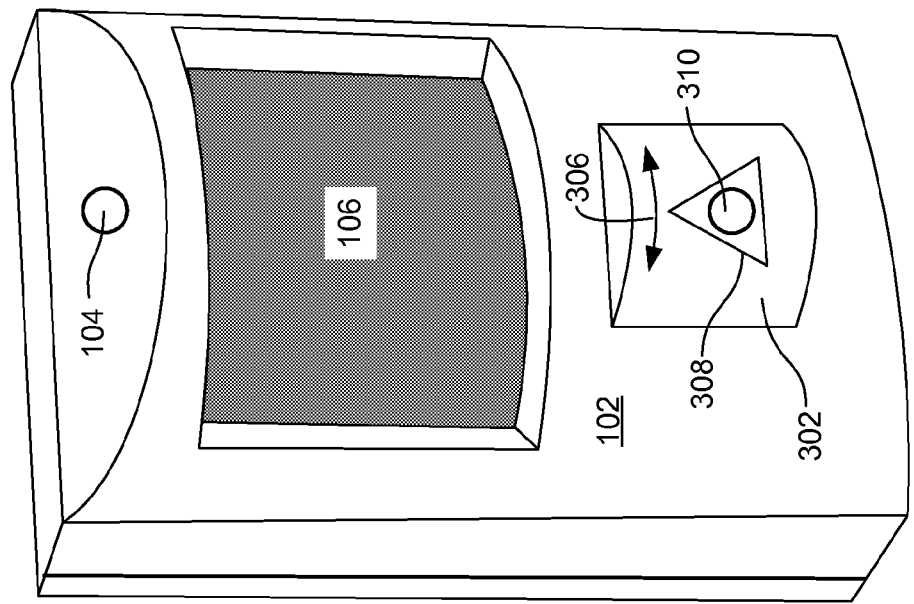
FIGS. 3A and 3B are isometric views of an exemplary masked camera motion detector capable of obstructing or exposing a camera lens, according to one embodiment of principles described herein.
Figure 3A:
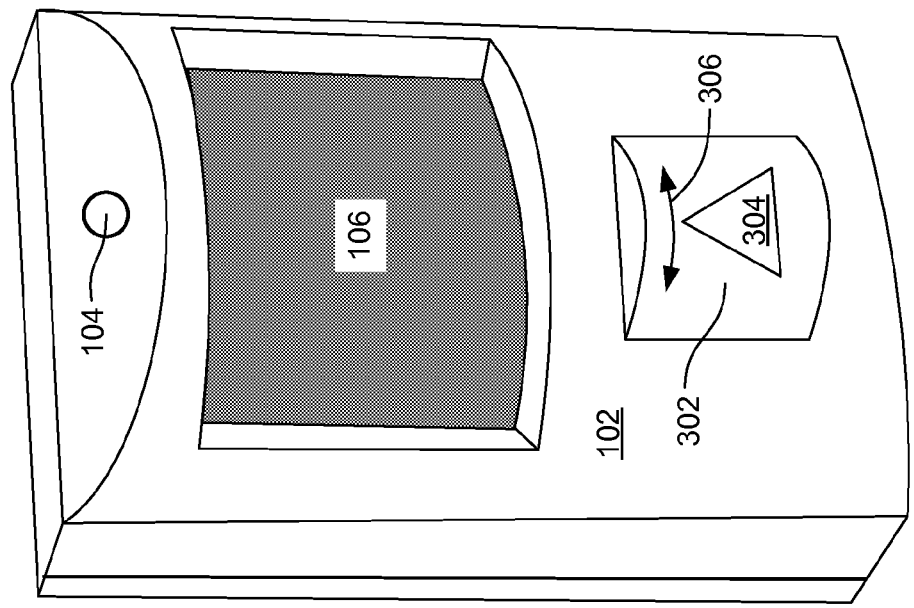

FIGS. 3A and 3B are isometric views of an exemplary masked camera motion detector (300) capable of obstructing or exposing a camera lens. In one embodiment, the movable member which masks the camera lens (310) could be a rotating hollow cylindrical piece (302). This cylindrical piece (302) could protrude out from the chassis (102) of the motion detector device (300). The outer side of the cylindrical piece (302) could have a solid shape (304) on one side which will obstruct the camera lens (310) when the camera system is in an inactive mode as shown in FIG. 3A. When the camera goes into surveillance mode as shown in FIG. 3B, the cylindrical piece rotates (306) so that a transparent shape (308) is in front of the camera lens (310), thus allowing the camera system to monitor the area.

The exact shape of either the solid shape (304) or transparent shape (308) is not limited to the triangle shape shown. The shape could be of any design including a logo or symbol.

FIGS. 4A and 4B are top cross-sectional views of an exemplary camera lens section of an exemplary masked camera motion detector (400). A camera system (406) is placed within the chassis (402) of a motion detector device (300, FIG. 3). When the camera system (406) is in an inactive state as shown in FIG. 4A, the cylindrical piece (408) is positioned so that a solid section (410) is in front of the camera lens (414) so as to obstruct the lens (414) from a privacy sensitive area. When the camera system (406) is in a surveillance mode as shown in FIG. 4B, the cylindrical piece is positioned so that a transparent section (412) is in front of the camera lens (414) thus allowing the camera to monitor the area. The transparent section (412) may be made of any material which will allow the camera lens (414) to detect light from without the cylindrical piece. In one embodiment, the transparent section (412) could simply be an opening in the material forming the cylindrical piece (408).

The cylindrical piece (408) could be caused to rotate (416) by any means known in the art. In one embodiment, the cylindrical piece (408) could be secured along a track and be caused to rotate (416) through any electrical, magnetic, or mechanical force. The means by which to move the cylindrical piece may be placed anywhere inside (404) the chassis (402) of the device.

The solid section (410) and the transparent section (412) need not be 180 degrees apart as shown. The solid section (410) and the transparent section (412) may be any space apart along the cylindrical piece. The solid section may be made of any material which does not allow enough light sufficient for a camera to operate to pass through. In one embodiment, the solid section may be formed of the same material forming the cylindrical piece (408). The transparent section (412) may be formed of any material able to let in enough light sufficient for a camera to operate and monitor the area.

Figure 5:
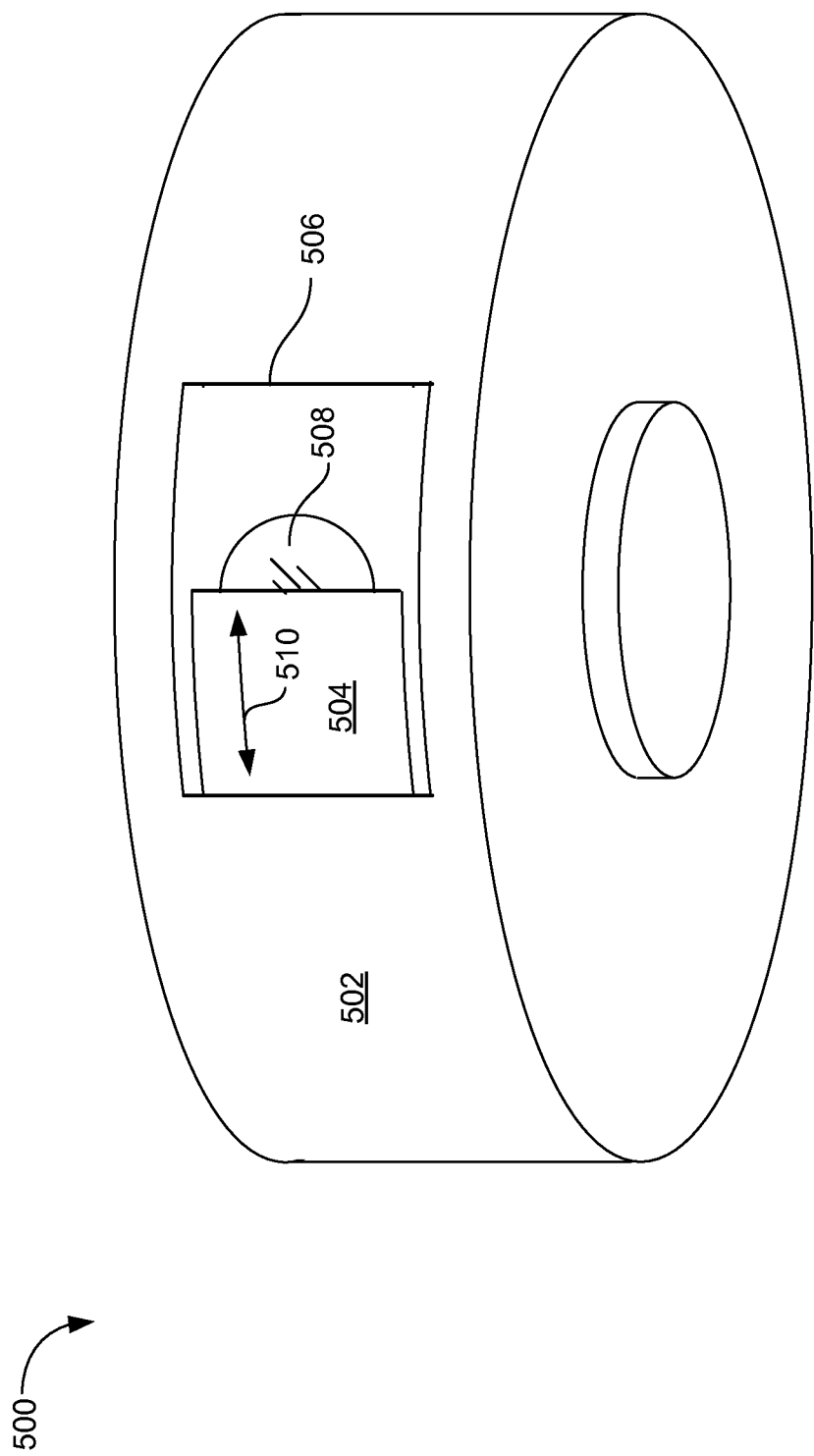
FIG. 5 is an illustrative depiction of an exemplary foreign substance detector with an exemplary masked camera lens, according to one embodiment of principles described herein.

FIG. 5 is an illustrative depiction of an exemplary foreign substance detector (500) with an exemplary masked camera lens. In one embodiment, the masked camera could be placed inside a smoke or other foreign substance detector (500). A common form for a smoke or other foreign substance detector is a thick disk shaped device which is attached to a ceiling or a wall. According to one illustrative embodiment, the foreign substance detector (500) could have a window (506) in the side section (502) of the device. The window (506) could open up to a camera system embedded inside the foreign substance detector (500). A movable member (504) may be able to move in front of the camera lens (508), thus obstructing the lens during an inactive mode. When the camera system is in a surveillance mode, the movable member (504) could slide (510) and move out of the way of the camera lens (508), thus allowing the area in which the foreign substance device (500) is located to be monitored.

Like other embodiments previously discussed, the movable member (504) could be made of any material which will sufficiently block light from the camera lens (508). The movable member (504) itself may be caused to slide (510) by any means known in the art.

Figure 6:
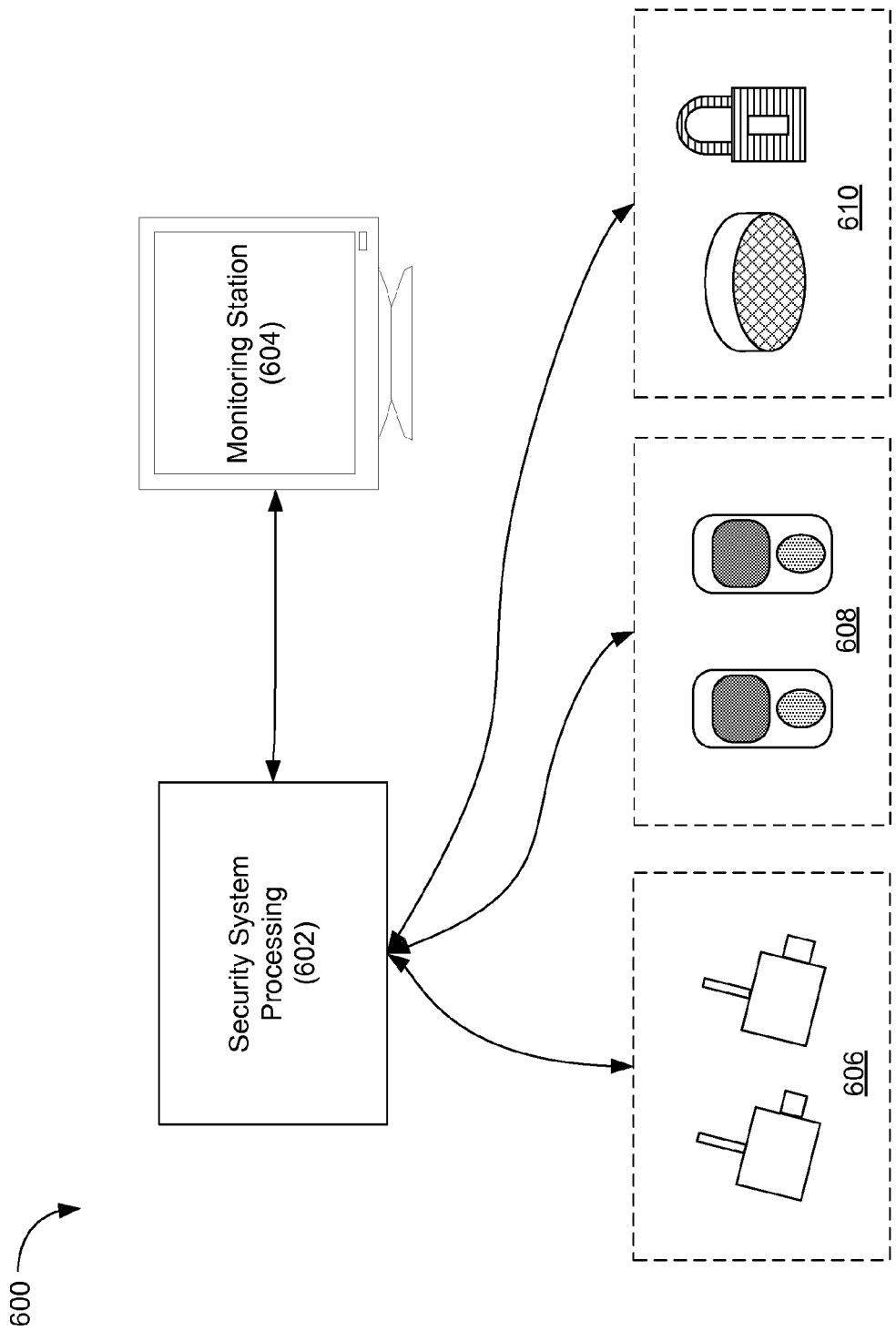
FIG. 6 is an illustrative diagram showing an exemplary security system which employs masked cameras in privacy sensitive areas, according to one embodiment of principles described herein.

FIG. 6 is an illustrative diagram showing an exemplary security system (600) which employs masked cameras (608) in privacy sensitive areas or areas not under continual camera surveillance. A typical security system (500) comprises a central processing system (602), a monitoring station (604) and other security devices including but not limited to cameras, electronically controlled locks, foreign substance detectors, and motion detectors. At least one monitoring station (604) is used to monitor a facility. The security devices such as cameras and motion detectors provide information that is processed by the central processing system and displayed to security officials at a monitoring station (604). In one embodiment, a security system (600) could make use of cameras (606) monitoring regular areas of a facility and masked cameras (608) monitoring privacy sensitive areas including but not limited to restrooms, changing rooms, classrooms, offices, and briefing rooms. Other security devices (610) such as foreign substance detectors and electronic locks may be used as well. The masked cameras (608) will typically be in an inactive state. In this state, they are not able to monitor the areas in which they are located. The cameras are masked so as not to make persons in privacy sensitive areas feel like they are being watched. During a high-risk situation including but not limited to a shooting or hostage situation, for safety and security reasons, it may be beneficial to activate the masked cameras (608) in privacy sensitive areas. When a security situation with a high enough threat level is determined by security officials, the movable members of the masked cameras may change their position so as to expose the camera lenses, thus allowing the cameras to monitor the privacy sensitive areas if necessary.

Figure 7:
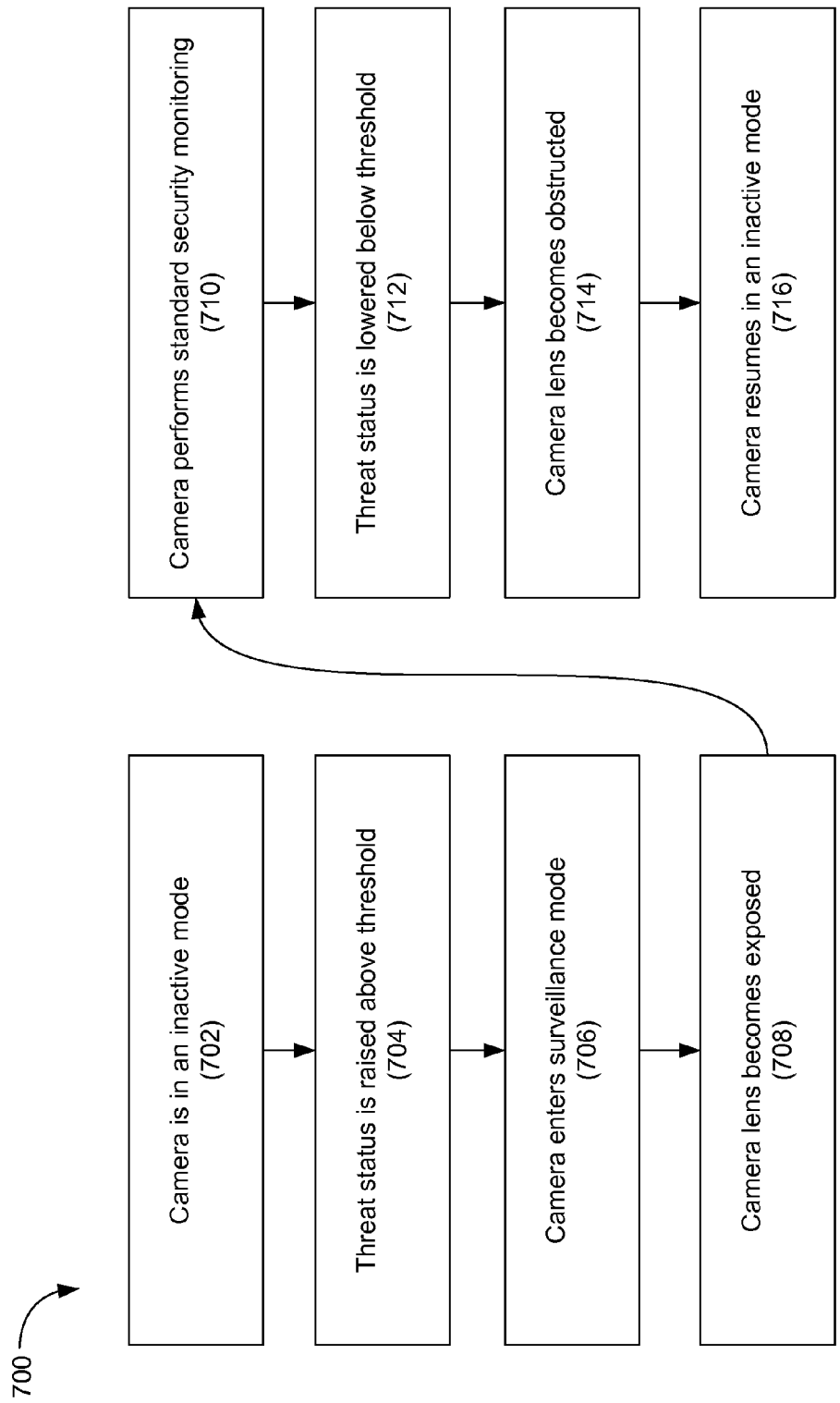
FIG. 7 is a flow chart depicting the process for obstructing or exposing a camera lens based on security conditions, according to one embodiment of principles described herein.

FIG. 7 is a flow chart (700) depicting the process for obstructing or exposing a camera lens based on security conditions. Most of the time, the camera will be in an inactive mode (702). In this mode the camera lens will be physically obstructed from monitoring the area. In the event of a high level threat, the need for privacy may be superseded by the need for safety and security. If the threat level is above a certain predetermined threshold (704), the camera will enter a surveillance mode (706). In a surveillance mode, the movable member obstructing the camera lens will change position so as to expose the camera lens (708). The camera may then be able to monitor the area and provide security monitoring to all areas of the facility (710). After the threat is over, the threat level will be reduced (712). The movable member will then move back to a position that obstructs the camera lens (714). The camera may then resume the standard inactive mode (716).

In sum, a camera system is masked within an alternative security device such as a motion detector or a smoke detector. Under normal conditions, the camera lens is obstructed from monitoring a privacy sensitive area in which it is placed. During a high threat level, a movable member obstructing the camera lens changes position so as to allow the camera to monitor the area. When the high level threat is over, the camera lens is then obstructed again. The innovation described herein allows areas not normally under continually camera surveillance to be monitored in the event of a high threat level such as a hostage situation or shooting situation where safety and security may supersede privacy. By having the cameras masked within other devices, such as standard household items including, but in no way limited to books, pillows, motion sensors, and/or smoke detectors, persons using privacy sensitive areas will not feel uncomfortable.

The preceding description has been presented only to illustrate and describe embodiments and examples of the principles described. This description is not intended to be exhaustive or to limit these principles to any precise form disclosed. Many modifications and variations are possible in light of the above teaching.

What is claimed is:

1. A device for monitoring an area, the device comprising;
   a housing chassis having an external appearance of a non-image-receiving device;
   an image receiving device disposed inside said housing chassis, said image receiving device including a camera lens;
   a movable obstruction member having a masking element obstructing and disguising the existence of said image receiving device inside said housing chassis while said movable obstruction member is in a first position, said masking element preserving said external appearance in said first position, wherein said masking element comprises a hole in said movable obstruction member, said hole preserving said external appearance by providing access to another feature of said device in said first position and exposing said camera lens in said second position;

wherein said movable obstruction member is configured to move to a second position within said housing chassis in relation to said camera lens in response to a monitoring status signal, said movable obstruction member exposing said camera lens when in said second position.

2. The device of claim 1, wherein said monitoring status signal comprises one of an active signal or an inactive signal;
wherein said movable obstruction member is positioned to obstruct said camera lens in response to an inactive signal; and
wherein said movable obstruction member is positioned not to obstruct said camera lens in response to an active signal.

3. The device of claim 2, wherein said movable obstruction member is a disc having a center axis, said disc rotating about the center axis between the first position and the second position.

4. The device of claim 2, wherein said another feature of said device is an opening for a fastener.

5. The device of claim 1, wherein said movable obstruction member comprises a rotatable cylindrical member protruding from said housing chassis, the rotatable cylindrical member having a first side and a second side;
wherein said first side of said rotatable cylindrical member defines a transparent section, said transparent section comprising an opening or a transparent material;
wherein said second side disguises the existence of said image receiving device by obscuring said camera lens when said rotatable cylindrical member is in said first position;
wherein said transparent section is configured to be selectively aligned with said camera lens when said rotatable cylindrical member is in said second position.

6. The device of claim 1, wherein said movable member comprises a sliding member configured to selectively slide relative to said camera lens between said first and second positions.

7. The device of claim 6, wherein said sliding member includes an optically transparent section configured to selectively expose said camera lens when said sliding member is selectively positioned.

8. The device of claim 1, wherein said hole comprises a transparent window in said movable obstruction member.

9. The device of claim 1, wherein said hole comprises an electrochromatic window in said movable obstruction member configured to become transparent in response to application of an electrical current.

10. The device of claim 1, wherein said non-image-receiving device is a foreign substance detector.

11. The device of claim 1, wherein said non-image-receiving device is a motion detector of a security system.

12. A method for selectively masking a camera lens, the method comprising;
disposing an image receiving device inside a housing chassis, said housing chassis having an external appearance of a non-image-receiving device, said image receiving device including a camera lens and a movable member having a masking element obstructing and disguising the existence of said image receiving device inside said housing chassis while said movable member is in a first position, said masking element preserving said external appearance in said first position, wherein said masking element comprises a hole in said movable member, said hole preserving said external appearance by providing access to another feature of said device in said first position and exposing said camera lens in said second position;
receiving a monitoring status signal indicating an inactive mode or an active mode; and
selectively positioning said movable member within said housing chassis to obscure and disguise said camera lens and preserve said external appearance in response to said monitoring status signal indicating an inactive mode, and
selectively positioning said movable member within said housing chassis to expose said camera lens in response to said monitoring status signal indicating an active mode.

13. A security system for a facility, the system comprising:
an at least partially private area of the facility;
at least one masked camera positioned at the facility, said masked camera comprising:
a housing,
a camera sensor disposed within said housing, and
a movable member with a masking element selectively positionable between an obstructing position and an exposing position, said movable member exposing said camera sensor for surveillance of said at least partially private area when in said exposing position, wherein said masking element comprises a hole in said movable member, said hole preserving an external appearance by providing access to another feature of said camera in said obstructing position and exposing said camera sensor in said exposing position; and
a computing module configured to:
receive a monitoring status signal;
compare said monitoring status signal to a threshold level;
in response to said monitoring status signal not exceeding said threshold level, send a control signal indicating positioning of said movable member in said obstructing position, and
in response to said monitoring status signal exceeding said threshold level, send a control signal indicating positioning of said movable member in said exposing position.

14. The system of claim 13, wherein said housing has an external appearance of a non-image-receiving device.

15. The system of claim 14, wherein said monitoring status signal is sent from a remote transmitter.

16. The system of claim 14, further comprising at least one threat sensor at the facility, wherein said monitoring status signal sent from said threat sensor.

17. The system of claim 16, wherein said threat sensor is selected from the group consisting of: a motion detector, a foreign substance detector, and an alarm input device.

18. The system of claim 16, wherein said threshold level is determined based on a degree of privacy desired for the at least partially private area.

* * * * *